Dec. 8, 1959 L. J. DYKSTRA ET AL 2,915,789
METHOD OF MAKING DRILL JIGS
Filed July 25, 1957 2 Sheets-Sheet 1

INVENTORS
L. J. DYKSTRA
L. J. KEHL
BY C. B. Hamilton
ATTORNEY

Dec. 8, 1959   L. J. DYKSTRA ET AL   2,915,789
METHOD OF MAKING DRILL JIGS
Filed July 25, 1957   2 Sheets-Sheet 2

INVENTORS
L. J. DYKSTRA
L. J. KEHL
BY C. B. Hamilton
ATTORNEY

United States Patent Office 2,915,789
Patented Dec. 8, 1959

2,915,789

METHOD OF MAKING DRILL JIGS

Lucas J. Dykstra, Chicago, and Lawrence J. Kehl, Berwyn, Ill., assignors to Western Electric Company, Incorporated, New York, N.Y., a corporation of New York Application July 25, 1957, Serial No. 674,231

5 Claims. (Cl. 18—59)

This invention relates to methods of making drill jigs and more particularly to methods of making drill jigs wherein drill bushings are accurately located in a molded body.

It is an object of the present invention to provide new and improved methods of making lightweight and inexpensive drill jigs.

Another object of the invention is to provide methods for making drill jigs economically without sacrificing accuracy.

A method illustrating certain features of the invention may comprise molding a hollow bottomless body having two sides, two ends and a top in a suitable mold with enlarged holes in predetermined locations in the top of the body. Simultaneously with the molding of the body, internally threaded members are fixed in a side and an end of the body for receiving screws to accurately position the body on a panel to be drilled. The body is then mounted on a master form or panel having pins on it which extend through the enlarged holes in the top of the body. Drill bushings are positioned on the pins in the enlarged holes, whereupon a molding material is poured into the holes around tthe drill bushings and cured. The internally threaded members are provided to receive externally threaded members, which will press against a side and an end of either the master panel, or the panel to be drilled, to accurately locate the drill bushings predetermined distances from a side and an end of the panel serving as reference surfaces.

A complete understanding of the invention may be had by reference to the following detailed description, when considered in conjunction with the accompanying drawings wherein.

Figure 1:
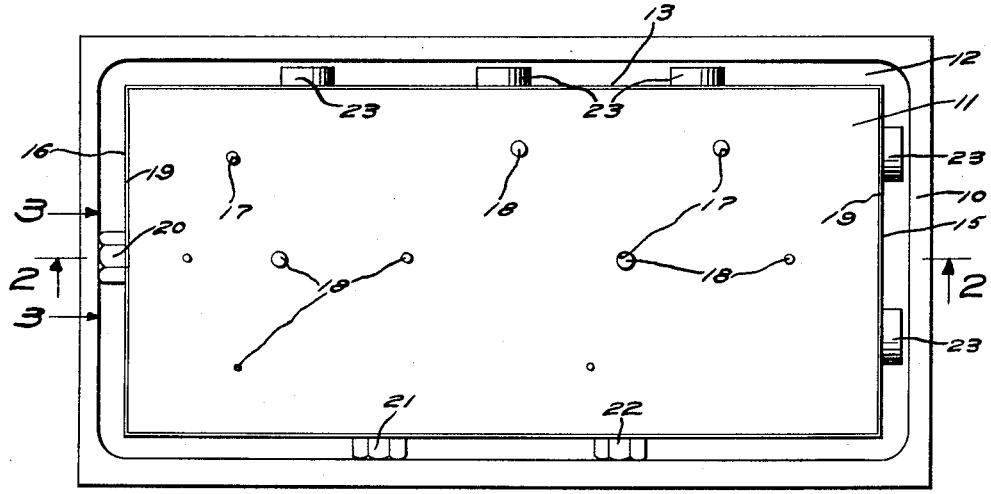
Fig. 1 is a plan view of an open-faced mold in which a block-like master panel or form has been positioned.
Figure 2:
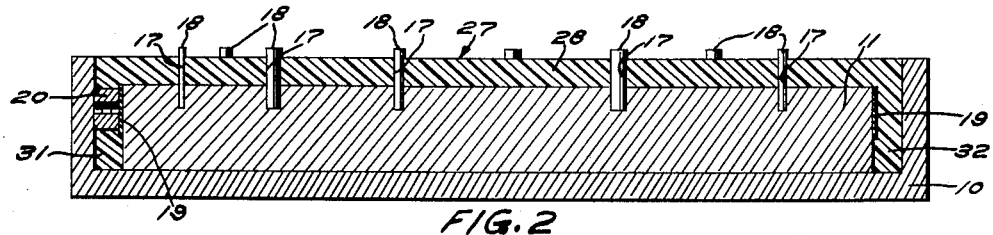
Fig. 2 is a longitudinal section view taken substantially along the line 2—2 of Fig. 1, showing the master panel or form in proper position in the mold and also showing the material which has been poured into the mold to enclose the sides, ends and top of the master panel.

Referring now to the drawings, wherein like reference characters designate the same parts throughout the several views, and with particular reference to Fig. 1, there is shown an open-faced mold 10. The open-faced mold 10 is made large enough to receive a block-like master form or panel 11 and to provide a space 12 (Fig. 1) between the sides and ends of the mold and sides 13 and 14 and ends 15 and 16 of the master panel 11. The master panel 11 is provided with a plurality of holes 17 of various sizes, which are located in the identical positions where holes of the same sizes are to be drilled in panels or work parts having the same dimensions as the master panel 11. Pins 18 of sizes which will fit snugly into the holes 17 are positioned therein.

A tacky tape 19 is temporarily affixed to the panel 11 with its tacky side out and extends around the panel 11. The tape 19 serves to support internally threaded members in the form of hexagonal nuts 20, 21 and 22 and hardened, disc-like metallic inserts 23, positioned as illustrated in Fig. 1.

After the panel 11 is thus prepared with the pins 18 mounted in it and the nuts 20, 21 and 22 and inserts 23 attached to it, a thin layer of grease is applied to the panel 11 and the mold 10 so that molding material will not adhere to them. The panel 11 is then placed in the mold 10 as shown in Fig. 1. A moldable plastic material, such as, for example, one of the well-known polyester, epoxy or phenolic casting resins, is then poured into the mold to substantially fill it, the material covering the ends, sides and the top of the panel. The nuts 20, 21 and 22 and the metallic inserts 23 are imbedded in the plastic or moldable material which flows around them. The plastic is then hardened in a well-known manner to form a jig body designated generally by the numeral 27, which body has a top 28, sides 29 and 30 and ends 31 and 32.

Figure 4:
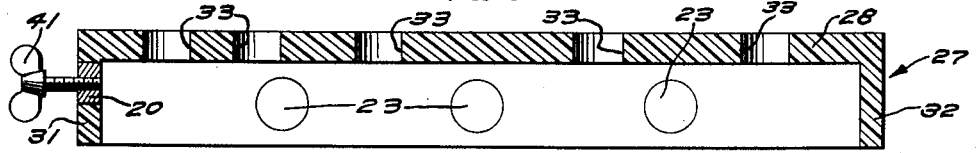
Fig. 4 is a longitudinal sectional view of a molded part with the internally threaded member and disc-like inserts imbedded in it and with a thumb screw threaded into the nut.
Figure 5:
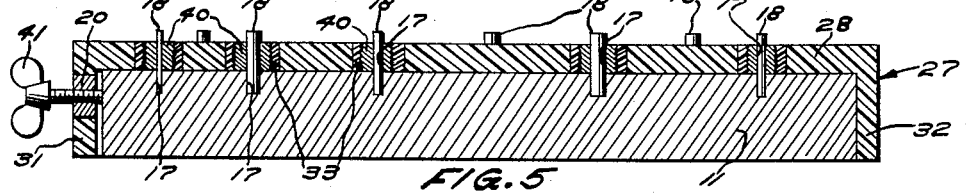
Fig. 5 is a view similar to Fig. 4 but showing the master panel or form clamped in position in the molded body with the drill bushings located in their final positions.
Figure 3:
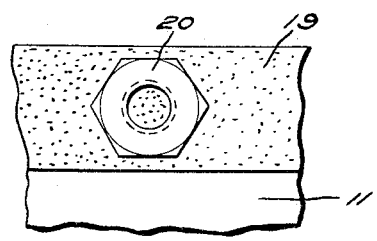
Fig. 3 is an enlarged fragmentary view taken substantially along the line 3—3 of Fig. 1 showing a threaded nut mounted in place on the master panel prior to pouring the molding material into the mold.

After the plastic or molding material has hardened, the body 27 is removed from the mold 10, and the pins 18 are removed from the body if they have adhered to it. Oversized holes 33 (Fig. 4) are now drilled or reamed in the top 28 of the jig body 27 substantially coaxially with the holes that were molded in the top 28 by the pins 18.

The jig body 27 of plastic or molding material, as is usual with materials of this type, will shrink to some extent in curing. Consequently, if the drill bushings which are to be mounted in the drill jig had been molded directly into the body during the molding of it, the shrinkage of the jig body 27 might be great enough to destroy the desired alignment of the bushings by slightly varying the positions of the bushings.

After the over-sized holes 33 are drilled in the top 28 of the body 27, the body is again placed over the master panel 11 and the pins 18 are reinserted in the holes 17 in the panel 11 to extend upward through the holes 33. After the pins have been reset in the panel 11, drill bushings 40 conforming in size to the size of the pins 18 are placed over the pins. Then thumb screws 41 are threaded into each one of the nuts 20, 21 and 22 and forced against the panel 11 to draw the end 32 and the side 29 of the body 27 tightly against the end 15 and side 13 of the panel 11. When the body is thus clamped, the end 32 and side 29 of the body 27 will serve as reference surfaces for accurately locating the drill bushings with respect to their proper locations.

With the drill bushings 40 thus located and the pins 17 exactly the proper distances from the end 32 and side 29 of the body 27, molten plastic is poured into the oversized holes 33 around the bushings 40 positioned on the pins 18. The plastic poured into the holes 33 is preferably of a different color for each different size of central aperture in the drill bushings 40. This colored plastic will thus identify the size drill which is to enter the various sized bushings and the drill jig comprising the body 27 may then be mounted over panels 43 which are to be drilled in accordance with the patterns as determined by the master form or panel 11. The metallic inserts 23 serve as bearing surfaces to protect the end 32 and the side 29 of the body 27 during use of the device.

Figure 6:
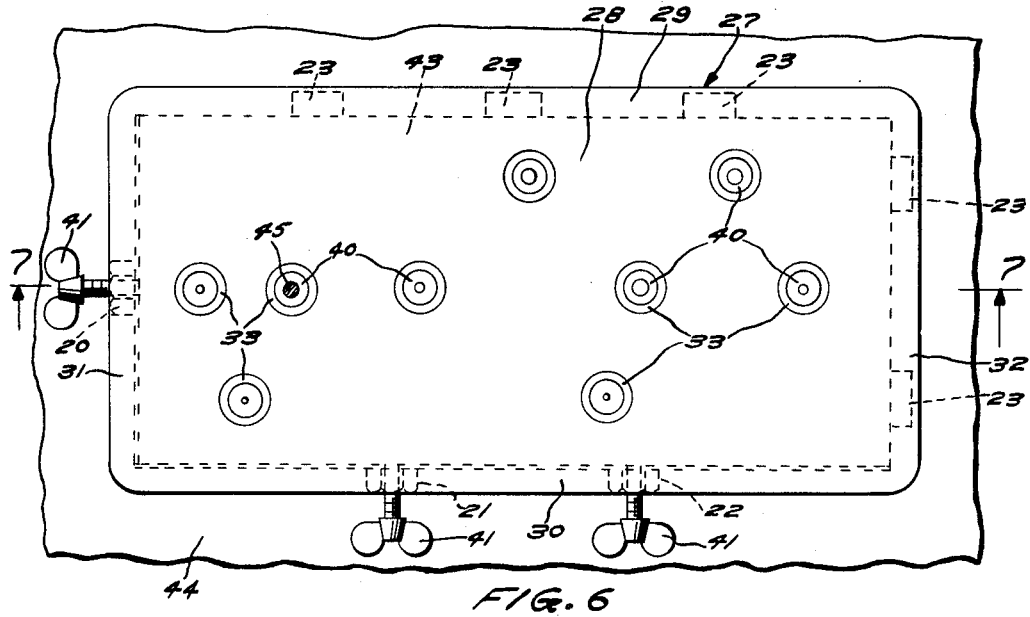
Fig. 6 is a view illustrating the completed drill jig mounted on a panel in which holes are to be drilled.
Figure 7:
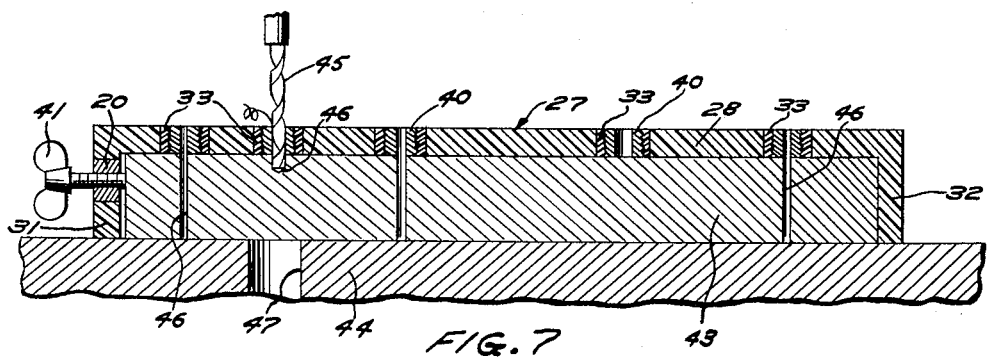
Fig. 7 is a longitudinal sectional view taken on the line 7—7 of Fig. 6 in the direction of the arrows.

The method of using the drill jig is clearly illustrated in Figs. 6 and 7, wherein the end 32 and side 29 of the body 27 have been drawn up tightly against one side and one end of a panel 43 through which holes are to be drilled, this being accomplished by manipulating the thumb screws 41 to clamp the body 27 onto the panel 43. The drill jig comprising the body 27, clamped to the panel 43 which is to be drilled, may be moved about on a bed 44 of a drill press to align a drill 45 with the drill bushings 40. Drills of different sizes may be utilized to drill holes 46 of various sizes in panels 43, suitable apertures 47 being provided in the bed 44 of the drill press for freely receiving the drills. The operator using the jig may determine from a color code the exact size of drill 45 which is to be guided by a bushing 40 in accordance with the color of the plastic surrounding the bushings 40 in the body 27.

The body 27 has been described as being made from the material commonly known as casting resin but other materials may also be used which might require different types of curing processes. However, the invention may be practiced using other materials. Furthermore, various other modifications may be made without departing from the scope of the invention.

What is claimed is:

1. The method of making drill jigs comprising forming a hollow body having sides, ends and a top with oversize holes in predetermined locations in the top, simultaneously with the forming of the body fixing internally threaded members in one side and one end of the body, positioning said body on a master form having pins on it which extend through oversize holes in the top of the body, utilizing said threaded members to clamp said body against the other end and the other side of said form, placing drill bushings on the pins in the oversize holes, and placing molding material in said oversize holes surrounding the bushings to locate said bushings in said body accurately spaced from said other side and other end of said body.

2. The method of making drill jigs having drill bushings located at predetermined locations in a body of molded material comprising forming a hollow body having ends, sides and a top with oversize holes at predetermined locations in the top, said body having members threaded through one side and one end thereof, positioning the body and a master form which has locating pins set into it and extending through the oversize holes, utilizing the threaded members for accurately positioning the molded body on the master form, placing bushings in the oversize holes and on the pins set into the master form, and placing moldable material in the oversize holes in the molded body surrounding the bushings to accurately locate the bushings.

3. The method of making drill jigs comprising forming a body having sides, ends, and a top with oversized holes in predetermined locations therein; said body having thumb screws extending through one side and one end thereof; positioning the body on a master form having pins extending through the over-sized holes in the top of the body; operating the thumb screws to clamp said body against another side and another end of said form; placing drill bushings on the pins and in the over-sized holes in the top of the body; and pouring molding material into said over-sized holes surrounding the bushings to locate said bushings in said body accurately spaced from said another side and end of the body.

4. The method of making drill jigs comprising forming a hollow body of casting resin having sides, ends and a top with holes in predetermined locations in the top; simultaneously with the forming of the body fixing internally threaded members in one side and one end of the body; positioning said body on a master form having pins on it which extend through the holes in the top of the body; utilizing said threaded members to clamp said body against another side and another end of said form; placing drill bushings of different sizes on the pins and in the holes; and pouring colored casting resin in each of said holes surrounding the bushings to locate said bushings in said body accurately spaced from said another side and another end of said body; the color of the casting resin poured around the bushings being different for each different size of bushing.

5. The method of making drill jigs comprising forming a hollow body having two parallel sides, two parallel ends and a top with oversized holes in predetermined locations in the top; simultaneously with the forming of the body fixing threaded members in one side and one end of the body; positioning the body on a master form having pins extending through the over-sized holes in the top of the body; utilizing said threaded members to clamp said body against the other side and the other end of said form; placing drill bushings on the pins and in the over-sized holes; pouring casting resin into said over-sized holes surrounding the bushings to locate the bushings in said body in positions accurately spaced from said another side and another end of said body, and curing the resin in the holes.

References Cited in the file of this patent
UNITED STATES PATENTS

| | | |
|---|---|---|
| 2,255,184 | Osenberg | Sept. 9, 1941 |
| 2,392,804 | Basolo | Jan. 15, 1946 |
| 2,732,613 | Renholts | Jan. 31, 1956 |